United States Patent
Zhong et al.

(10) Patent No.: US 12,230,803 B2
(45) Date of Patent: Feb. 18, 2025

(54) SECONDARY BATTERY, METHOD FOR PREPARING THE SAME, COPOLYMER AND APPARATUS

(71) Applicant: CONTEMPORARY AMPEREX TECHNOLOGY (HONG KONG) LIMITED, Hong Kong (CN)

(72) Inventors: Ze Zhong, Ningde (CN); Hao Dong, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 311 days.

(21) Appl. No.: 17/745,935

(22) Filed: May 17, 2022

(65) Prior Publication Data

US 2022/0285687 A1    Sep. 8, 2022

Related U.S. Application Data

(63) Continuation of application No. PCT/CN2019/122725, filed on Dec. 3, 2019.

(51) Int. Cl.

| | |
|---|---|
| *H01M 4/62* | (2006.01) |
| *C08F 210/02* | (2006.01) |
| *C08F 216/04* | (2006.01) |
| *C08F 220/54* | (2006.01) |
| *H01M 50/411* | (2021.01) |
| *H01M 4/02* | (2006.01) |

(52) U.S. Cl.
CPC ........... *H01M 4/622* (2013.01); *C08F 210/02* (2013.01); *C08F 216/04* (2013.01);
(Continued)

(58) Field of Classification Search
CPC ............... H01M 4/622; H01M 50/411; H01M 2004/027; H01M 2004/028; C08F 210/02; C08F 216/04; C08F 220/54
See application file for complete search history.

(56) References Cited

U.S. PATENT DOCUMENTS

| | | | | |
|---|---|---|---|---|
| 2020/0152985 | A1* | 5/2020 | Yamamoto | H01M 50/449 |
| 2021/0167389 | A1* | 6/2021 | Maeda | H01M 10/0562 |
| 2021/0189037 | A1* | 6/2021 | Pan | H01M 4/136 |

FOREIGN PATENT DOCUMENTS

| | | |
|---|---|---|
| CN | 103724523 A | 4/2014 |
| CN | 108155386 A | 6/2018 |

(Continued)

OTHER PUBLICATIONS

EPO machine generated English translation of WO 2015-146787 A1 (Year: 2015).*

(Continued)

*Primary Examiner* — Sean P Cullen
*Assistant Examiner* — Kimberly Wyluda
(74) *Attorney, Agent, or Firm* — East IP P.C.

(57) ABSTRACT

The present application discloses a secondary battery, a method for preparing the same, a copolymer and an apparatus. The secondary battery includes a binder for binding a first substance and a second substance, the binder including a copolymer, wherein the copolymer comprises at least a first monomer unit represented by formula (I), a second monomer unit represented by formula (II), and a third monomer unit represented by formula (III):

Formula (I)

(Continued)

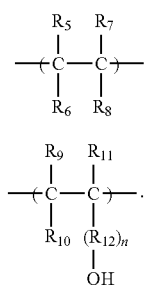

Formula (II)

Formula (III)

The secondary battery provided by the present application can effectively increase the boding force between the first substance and the second substance by including a specific binder, thereby improving the electrochemical performance of the secondary battery.

12 Claims, 2 Drawing Sheets

(52) U.S. Cl.
CPC ..... *C08F 220/54* (2013.01); *H01M 2004/027* (2013.01); *H01M 2004/028* (2013.01); *H01M 50/411* (2021.01)

(56) References Cited

FOREIGN PATENT DOCUMENTS

| CN | 109216659 | A | 1/2019 |
|---|---|---|---|
| CN | 109423237 | A | 3/2019 |
| CN | 110088947 | A | 8/2019 |
| JP | 61186598 | A | 8/1986 |
| JP | 2012238488 | A | 12/2012 |
| JP | 2015070089 | A | 4/2015 |
| JP | 2015123404 | A | 7/2015 |
| JP | 2016012484 | A | 1/2016 |
| JP | 2020531649 | A | 11/2020 |
| JP | 2021039 862 | A | 3/2021 |
| KR | 20090019630 | A | 2/2009 |
| WO | 2012133030 | A1 | 10/2012 |
| WO | 2015146787 | A1 | 10/2015 |
| WO | 2019065370 | A1 | 4/2019 |

OTHER PUBLICATIONS

The extended European search report for European Application No. 19954823.1, dated Nov. 24, 2022, 10 pages.
Nicolas Fedelich:"Application Hand book Thermal Analysis of Polymers Selected Applications Thermal Analysis",Jan. 1, 2013, 35 pages.
Prof Premamoy Ghosh:"Polymer Science Fundamentals of Polymer Science", Sep. 21, 2006, 22 pages.
The First Office Action forIN Application No. 202227018389, dated Aug. 19, 2022, 8 pages.
The Third Office Action for JP Application No. 2022-520237, dated Nov. 7, 2023, 7 pages.
The First Office Action for CN Application No. 201980066475.1, dated Nov. 27, 2023, 20 pages.
The Written Decision on Registration for JP Application No. 2022-520237, dated May 14, 2024, 4 pages.
The International search report for PCT Application No. PCT/CN2019/122725, dated Aug. 19, 2020, 11 pages.
The First Office Action for JP Application No. 2022-520237, dated Apr. 18, 2023, 5 pages.

* cited by examiner

SECONDARY BATTERY, METHOD FOR PREPARING THE SAME, COPOLYMER AND APPARATUS

CROSS-REFERENCE TO RELATED APPLICATIONS

This application is a continuation of International Application No. PCT/CN2019/122725, filed on Dec. 3, 2019, entitled "SECONDARY BATTERY, METHOD FOR PREPARING THE SAME, COPOLYMER AND APPARATUS", which is incorporated herein by reference in its entirety.

TECHNICAL FIELD

The present application belongs to the technical field of secondary batteries, and specifically relates to a secondary battery, method for preparing the same, a copolymer and an apparatus.

BACKGROUND

In the field of energy storage, secondary batteries have been widely used in various digital products, portable devices, electric vehicles, energy storage power supplies, etc., due to their high energy density, long cycle life, safety and reliability, and no memory effect.

During the use of the secondary batteries, the active material layer in the electrode plate will expand to a certain extent during the cycle, resulting in a decrease in the bonding force between the electrode current collector and the active material layer, thus affecting the cycle life of the secondary battery.

SUMMARY

In order to solve the above technical problems, the present application provides a secondary battery and a method for preparing the same, a copolymer and an apparatus. By adopting the technical solution of the present application, the bonding force of the binder in the secondary battery can be effectively increased.

In order to achieve the above object, a first aspect of the present application provides a secondary battery including a binder for binding a first substance and a second substance, the binder including a copolymer, wherein the copolymer includes at least a first monomer unit represented by formula (I), a second monomer unit represented by formula (II), and a third monomer unit represented by formula (III):

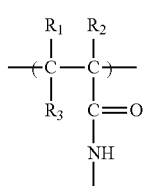

Formula (I)

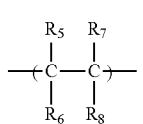

Formula (II)

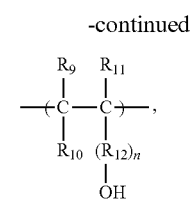

Formula (III)

in which $R_1$, $R_2$, $R_3$, $R_5$, $R_6$, $R_7$, $R_9$, $R_{10}$, and $R_{11}$ are each independently selected from hydrogen or C1-C8 alkyl groups;

$R_4$ is selected from hydrogen, substituted or unsubstituted C1-C8 alkyl groups;

$R_8$ is selected from —COOM and sodium sulfonate phenyl, in which M is selected from H, and positive monovalent (+1) alkali metal ion;

$R_{12}$ is selected from unsubstituted or substituted C1-C8 alkyl groups, and n is 0 or 1.

A second aspect of the present application provides a method for preparing a secondary battery, including using a copolymer in one or more of a positive electrode plate, a negative electrode plate and a separator, wherein the copolymer includes at least a first monomer unit represented by formula (I), a second monomer unit represented by formula (II), and a third monomer unit represented by formula (III):

Formula (I)

Formula (II)

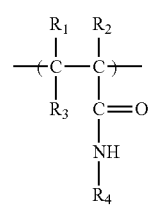

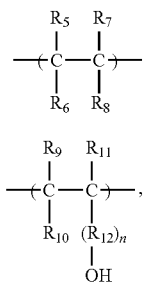

Formula (III)

in which $R_1$, $R_2$, $R_3$, $R_5$, $R_6$, $R_7$, $R_9$, $R_{10}$, and $R_{11}$ are each independently selected from hydrogen or C1-C8 alkyl groups;

$R_4$ is selected from hydrogen, substituted or unsubstituted C1-C8 alkyl groups;

$R_8$ is selected from —COOM and sodium sulfonate phenyl, in which M is selected from H, and positive monovalent (+1) alkali metal ion;

$R_{12}$ is selected from unsubstituted or substituted C1-C8 alkyl groups, and n is 0 or 1.

A third aspect of the present application provides a copolymer, wherein the copolymer includes at least a first monomer unit represented by formula (I), a second monomer unit represented by formula (II), and a third monomer unit represented by formula (III):

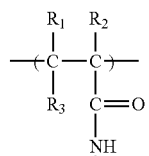

Formula (I)

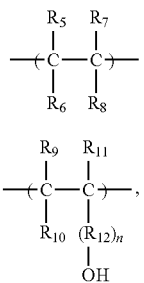

Formula (II)

Formula (III)

in which $R_1$, $R_2$, $R_3$, $R_5$, $R_6$, $R_7$, $R_9$, $R_{10}$, and $R_{11}$ are each independently selected from hydrogen or C1-C8 alkyl groups;

$R_4$ is selected from hydrogen, substituted or unsubstituted C1-C8 alkyl groups;

$R_8$ is selected from —COOM and sodium sulfonate phenyl, in which M is selected from H, and positive monovalent (+1) alkali metal ion;

$R_{12}$ is selected from unsubstituted or substituted C1-C8 alkyl groups, and n is 0 or 1.

A fourth aspect of the present application provides an apparatus, including the secondary battery as described above.

The secondary battery provided by the present application can effectively increase the bonding force between the first substance and the second substance by including a specific binder, thereby improving the electrochemical performance of the secondary battery.

Additional features and advantages of the present application will be described in detail in the detailed description that follows.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

Figure 1:
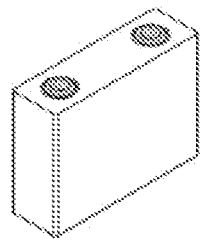
FIG. 1 is a schematic diagram of a secondary battery provided by an embodiment of the present application.

Among them, the reference signs are explained as follows:

1. Battery pack;
2. Upper case body;
3. Lower case body;
4. Battery module;
5. Secondary battery.

DETAILED DESCRIPTION

In order to make the object, technical solution, and technical effects of the present application apparent, the following further describes the present application in detail with reference to the embodiments. It should be understood that the embodiments described in the present description are only for explaining the present application, and are not intended to limit the application.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, as long as such components or steps do not affect the basic and novel characteristics of what is disclosed herein, but it is also contemplated that the compositions or processes may consist essentially of, or consist of, the recited components or steps.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise stated, the recitation of numerical ranges by "no less than" and "no more than" include all numbers within that range including the endpoints. As used herein, "a", "an", "the", "at least one", and "one or more" are used interchangeably, unless indicated otherwise and the recitation of "more" in the phrase "one or more" includes two or more.

The terms "preferred" and "preferably" refer to embodiments of the present application that can provide certain benefits under certain circumstances. However, under the same or other circumstances, other embodiments may also be optional. In addition, the recitation of one or more optional embodiments does not mean that other embodiments are unavailable, and is not intended to exclude other embodiments from the scope of the present application.

The above summary of the present application is not intended to describe each and every disclosed embodiment implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Secondary Battery

The first aspect of the present application provides a secondary battery comprising a binder for binding a first substance and a second substance, the binder comprising a copolymer, wherein the copolymer comprises at least a first monomer unit represented by formula (I), a second monomer unit represented by formula (II), and a third monomer unit represented by formula (III):

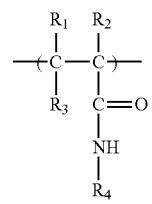

Formula (I)

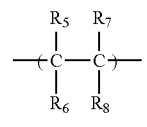

Formula (II)

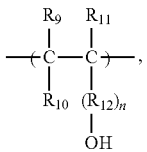

Formula (III)

in which $R_1$, $R_2$, $R_3$, $R_5$, $R_6$, $R_7$, $R_9$, $R_{10}$, and $R_{11}$ are each independently selected from hydrogen or C1-C8 alkyl groups;

$R_4$ is selected from hydrogen, substituted or unsubstituted C1-C8 alkyl groups;

$R_8$ is selected from —COOM and sodium sulfonate phenyl, in which M is selected from H, and positive monovalent (+1) alkali metal ion;

$R_{12}$ is selected from unsubstituted or substituted C1-C8 alkyl groups, and n is 0 or 1.

According to the present application, $R_1$, $R_2$, $R_3$, $R_5$, $R_6$, $R_7$, $R_9$, $R_{10}$, and $R_{11}$ are each independently selected from hydrogen or C1-C8 alkyl groups. The selection of $R_1$, $R_2$, $R_3$, $R_5$, $R_6$, $R_7$, $R_9$, $R_{10}$, and $R_{11}$ is independent of each other. For example, the selection of $R_1$ is independent of the selection of $R_2$.

In the present application, $C_1$-$C_8$ alkyl group can be a chain C1-C8 alkyl group, such as at least one of methyl, ethyl, n-propyl, isopropyl, n-butyl, isobutyl, sec-butyl, tert-butyl, n-pentyl, isopentyl, n-hexyl, n-heptyl and n-octyl.

According to a preferred embodiment, $R_1$, $R_2$, $R_3$, $R_5$, $R_6$, $R_7$, $R_9$, $R_{10}$, and $R_{11}$ are each independently selected from hydrogen or C1-C4 alkyl groups, such as at least one of hydrogen, methyl, ethyl, n-propyl, isopropyl, n-butyl, isobutyl, sec-butyl and tert-butyl, more preferably from at least one of hydrogen, methyl and ethyl, most preferably from hydrogen.

According to the present application, in the first monomer unit, $R_4$ is selected from hydrogen, unsubstituted or substituted C1-C8 alkyl groups. The C1-C8 alkyl group may be a chain C1-C8 alkyl group as described above. According to a preferred embodiment, $R_4$ is selected from hydrogen, unsubstituted or substituted C1-C4 alkyl groups, for example at least one of hydrogen, methyl, ethyl, n-propyl, isopropyl, n-butyl, isobutyl, sec-butyl and tert-butyl, more preferably from at least one of hydrogen, methyl, and ethyl, and most preferably from hydrogen.

According to the present application, the meaning of an unsubstituted C1-C8 alkyl group is an alkyl group with a carbon number of 8 or less that does not contain a substituent other than an alkyl group. A substituted C1-C8 alkyl group means a C1-C8 alkyl group containing a substituent other than an alkyl group. The substituted C1-C8 alkyl group, i.e. $R_4$, may be at least one of hydroxymethyl, hydroxyethyl, hydroxypropyl, —CH$_2$CH(OH)CH$_3$, —(CH$_2$)$_2$N(CH$_3$)$_2$, —C(CH$_3$)$_2$CH$_2$COCH$_3$.

In a preferred embodiment of the present application, the first monomer unit comprises at least one of monomer units derived from A1 to A3 monomers; more preferably, the first monomer unit comprises monomer units derived from A1 monomer:

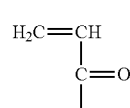

(A1)

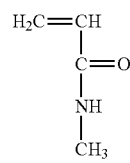

(A2)

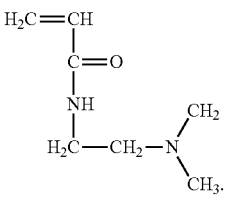

(A3)

According to the present application, in the second monomer unit, $R_8$ can be selected from at least one of —COOM and sodium sulfonate phenyl, in which M is hydrogen ion or positive monovalent alkali metal ion.

Preferably, $R_8$ is selected from —COOM, in which M is hydrogen ion or positive monovalent alkali metal ion.

Preferably, M is selected from positive monovalent alkali metal ion.

Preferably, the positive monovalent alkali metal ion is selected from at least one of Li, Na, and K; more preferably, M is selected from Na.

In a preferred embodiment of the present application, the second monomer unit comprises at least one of monomer units derived from B1 to B3 monomers; more preferably, the second monomer unit comprises monomer units derived from B1 monomer:

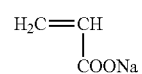

(B1)

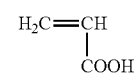

(B2)

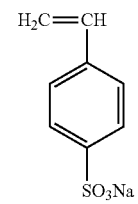

(B3)

According to the present application, in the third monomer unit, $R_{12}$ is selected from unsubstituted or substituted C1-C8 alkyl groups, and n is 0 or 1. When n is 0, $R_{12}$ does not exist. The C1-C8 alkyl group may be a chain C1-C8 alkyl group as described above. According to a specific embodiment, n is 0. According to a specific embodiment, $R_{12}$ is selected from unsubstituted or substituted C1-C4 alkyl groups, such as at least one of $-CH_2-$, $-CH_2CH_2-$, $-CH_2CH_2CH_2-$, $-CH_2CH(CH_3)CH_2-$, $-CH_2CH(OH)CH_2-$. According to a preferred embodiment, n is 0 or $R_{12}$ is $-CH_2-$.

In a preferred embodiment of the present application, the third monomer unit comprises at least one of monomer units derived from C1 to C3 monomers; more preferably, the third monomer unit comprises monomer units derived from C2 monomer.

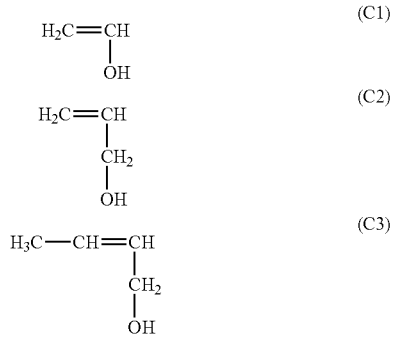

According to the present application, based on the total moles of the first monomer unit, the second monomer unit, and the third monomer unit, the content of the first monomer unit may be $\geq 40$ mol %, preferably 40 mol % to 90 mol %, more preferably 45 mol % to 85 mol %, still more preferably 60 mol % to 80 mol %. The inventors found that when the content of the first monomer unit is within the given range, the strength of the copolymer can be effectively improved.

According to the present application, based on the total moles of the first monomer unit, the second monomer unit, and the third monomer unit, the content of the second monomer unit may be $\leq 29.5$ mol %, preferably 4.5 mol % to 29.5 mol %, more preferably 6 mol % to 28 mol %, still more preferably 8 mol % to 18 mol %. The inventors found that when the content of the second monomer is within the given range, the slurry stability of the copolymer during use can be effectively improved, thereby improving the processability.

According to the present application, based on the total moles of the first monomer unit, the second monomer unit and the third monomer unit, the content of the third monomer unit may be $\leq 30.5$ mol %, preferably 5.5 mol % to 30.5 mol %, more preferably 7.5 mol % to 30 mol %, still more preferably 12 mol % to 24 mol %. The inventors found that when the content of the third monomer is within the given range, the flexibility of the copolymer can be effectively improved, and the cohesiveness of the copolymer can be effectively improved.

According to a preferred embodiment of the present application, in the copolymer, the molar ratio of the content of the first monomer unit to the content of the third monomer unit is 1:0.15-0.5, preferably 1:0.2-0.35. When the content ratio of the first monomer unit and the third monomer unit is within the given range, the copolymer of the present application can better balance strength and flexibility. When the copolymer is used in the electrode plate, it can better improve the swelling problem of the battery during the cycle.

According to a preferred embodiment of the present application, in the copolymer, the molar ratio of the content of the second monomer unit to the content of the third monomer unit is 1:1.05-2, preferably 1:1.1-1.6. When the content ratio of the second monomer unit to the third monomer unit is within the given range, the copolymer of the present application can better balance dispersibility and flexibility, thereby better improving processing performance of the copolymer during use.

According to a preferred embodiment of the present application, the copolymer may has a molecular weight ranging from 100,000 to 1,000,000, more preferably from 200,000 to 800,000. The above molecular weight is a weight average molecular weight.

According to the present application, the molecular weight of the copolymer can be measured in a conventional manner in the art. For example, the molecular weight of the copolymer can be measured using laser light scattering techniques, which are well known to those skilled in the art.

According to the present application, the copolymer preferably has a glass transition temperature Tg of from 30° C. to 80° C., more preferably from 40° C. to 70° C.

The Tg of copolymer A can be measured in a conventional manner in the art. For example, the glass transition temperature Tg of the copolymer can be measured by differential scanning calorimetry (DSC), which is well known to those skilled in the art. For example, a STA 449 F3-typed NETZSCH device can be used for such measurement.

According to the present application, an aqueous solution containing 10% by weight of the copolymer has a pH of above 7, preferably from 8 to 9. When the pH value of the copolymer is within the given range, the copolymer does not contain or substantially does not contain ester compounds (such as methyl methacrylate, butyl methacrylate, hydroxyethyl methacrylate, glyceryl methacrylate etc.). This is because when the pH of the copolymer is greater than 7, the ester compound will undergo a slow hydrolysis reaction, resulting in poor stability of the copolymer.

The secondary battery according to the present application comprises a positive electrode plate, a negative electrode plate and a separator, and one or more of the positive electrode plate, the negative electrode plate and the separator comprises the copolymer; preferably, the negative electrode plate comprises the copolymer. According to the present application, the negative electrode plate comprises a negative electrode current collector and a negative electrode film disposed on at least one surface of the negative electrode current collector.

In some embodiments, the negative electrode current collector has two opposite surfaces in its own thickness direction, and the negative electrode film is laminated on either or both of the two opposite surfaces of the negative electrode current collector. The negative electrode current collector can be made of materials with good electrical conductivity and mechanical strength. In some embodiments, copper foil is used as the negative electrode current collector.

The negative electrode film comprises a negative active material. The present application does not specifically limit the specific types of negative active materials, and active materials known in the art for negative electrode of secondary battery can be used, and those skilled in the art can select them according to actual needs.

In some embodiments, the negative active material may comprise one or more of graphite, mesophase carbon microspheres (MCMB in short), hard carbon, soft carbon, silicon-based materials, and tin-based materials.

In some embodiments, the negative electrode film optionally comprises a conductive agent. As an example, the conductive agent for the negative electrode film may be one or more selected from graphite, superconducting carbon, acetylene black, carbon black, Ketjen black, carbon dots, carbon nanotubes, graphene, and carbon nanofibers.

The secondary battery according to the present application further comprises a positive electrode plate comprising a positive electrode current collector and a positive electrode film disposed on at least one surface of the positive electrode current collector and including a positive active material.

As an example, the positive electrode current collector has two opposite surfaces in its own thickness direction, and the positive electrode film is laminated on either or both of the two opposite surfaces of the positive electrode current collector. The positive electrode current collector can be made of materials with good electrical conductivity and mechanical strength. In some embodiments, the positive electrode current collector may be an aluminum foil.

The present application does not specifically limit the specific types of positive active materials, and materials known in the art for the positive electrode of secondary battery can be used, and those skilled in the art can make selections according to actual needs.

In some embodiments, the positive active material may comprise lithium transition metal oxides and modified materials thereof, and the modified material may be lithium transition metal oxide subjected to doping modification and/or coating modification. For example, the lithium transition metal oxide can be one or more selected from lithium cobalt oxide, lithium nickel oxide, lithium manganese oxide, lithium nickel manganese oxide, lithium nickel cobalt manganese oxide, lithium nickel cobalt aluminum oxide and lithium containing phosphate with olivine structure.

As an example, the positive active material of the secondary battery can be one or more selected from $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$(LFP) and $LiMnPO_4$.

In some embodiments, the positive electrode film optionally comprises a conductive agent. The types of the conductive agent are not specifically limited, and those skilled in the art can make selections according to actual needs. As an example, the conductive agent used for the positive electrode film may comprise one or more of graphite, superconducting carbon, acetylene black, carbon black, Ketjen black, carbon dots, carbon nanotubes, graphene, and carbon nanofibers.

The secondary battery according to the present application further comprises an electrolyte. The electrolyte conducts ions between the positive electrode plate and the negative electrode plate. There is no specific limitation on the type of electrolyte in the present application, and it can be selected according to the requirement. For example, the electrolyte may be selected from at least one of solid electrolyte and liquid electrolyte (i.e., electrolytic solution).

In some embodiments, an electrolytic solution is used as the electrolyte. The electrolytic solution comprises an electrolyte salt and a solvent.

In some embodiments, the electrolyte salt may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate), and LiTFOP (lithium tetrafluorooxalate phosphate).

In some embodiments, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE).

In some embodiments, the electrolytic solution may optionally comprise an additive. For example, the additives may comprise negative electrode film-forming additives, positive electrode film-forming additives, and additives that can improve certain performance of the secondary battery, such as additives that improve overcharge performance of the secondary battery, additives that improve high-temperature performance of the secondary battery, and those that improve low-temperature performance of the secondary battery.

In secondary batteries that use electrolyte, and some secondary batteries that use solid electrolytes, a separator is further included. The separator is located between the positive electrode plate and the negative electrode plate to play a role of isolation. The separator includes a substrate and optionally, a functional coating. The separator is not particularly limited, and any well-known porous-structure separator having electrochemical stability and mechanical stability can be selected. In some embodiments, the separator can be one or more of glass fiber, non-woven fabric, polyethylene, polypropylene, and polyvinylidene fluoride. The separator can be a single-layer film or a multilayer film. When the separator is a multilayer film, the materials of the layers may be the same or different.

According to the secondary battery of the present application, one or more of the above-mentioned positive electrode plate, negative electrode plate and separator comprise the copolymer of the present application. In some embodiments, when one or more of the positive electrode plate, the negative electrode plate and the separator contain the copolymer of the present application, other binders may be further contained. Other binders can be one or more of oil-dispersible binder materials and water-dispersible binder materials. As an example, other binders may be one or more selected from styrene-butadiene rubber (SBR), sodium carboxymethyl cellulose (CMC-Na), polyvinylidene fluoride (PVDF), polyvinylidene fluoride copolymer, polytetrafluoroethylene, polystyrene, polyacrylonitrile, polyimide, polyacrylamide, polyacrylic acid, sodium polyacrylate, polyvinyl alcohol, sodium alginate, polymethacrylic acid and carboxymethyl chitosan.

When the copolymer of the present application is used in the positive and negative electrode plate, the mode of use can include but is not limited to the following (1)-(3) modes:

(1) The copolymer of the present application can be added to the positive and negative electrode films and used as a binder for the positive electrode film or the negative electrode film. In such a case, the first substance and the second substance are the components constituting the positive and negative electrode film (such as at least one of active materials, conductive agents and optional additives), respectively; the first substance and the second substance can also be positive electrode film and positive electrode current collector, or negative electrode film and the negative electrode current collector.

(2) The copolymer of the present application can form a functional coating on the surface of the positive and negative electrode current collectors. In such a case, the first substance and the second substance can be a positive electrode film and a positive current collector, or a negative electrode film and negative electrode current collector.

(3) The copolymer of the present application can form a functional coating on the surface of the positive electrode film or the negative electrode film. In such a case, the first substance and the second substance can be the components in the positive electrode film and the functional coating, or the components in the negative electrode film and the functional coating.

When the copolymer of the present application is used in a separator, it can be used in a functional coating of the separator, in which case the first substance and the second substance can be the substrate of the separator and each component in the functional coating.

In some preferred embodiments, the negative electrode plate comprises the copolymer.

In some embodiments, the mass proportion of the copolymer in the negative electrode film is $\geq 0.2\%$, preferably 0.6% to 4.0%.

The second aspect of the present application provides a method for preparing a secondary battery, including using in one or more of a positive electrode plate, a negative electrode plate and a separator, preferably in a negative electrode plate, a copolymer comprising at least a first monomer unit represented by formula (I), a second monomer unit represented by formula (II), and a third monomer unit represented by formula (III):

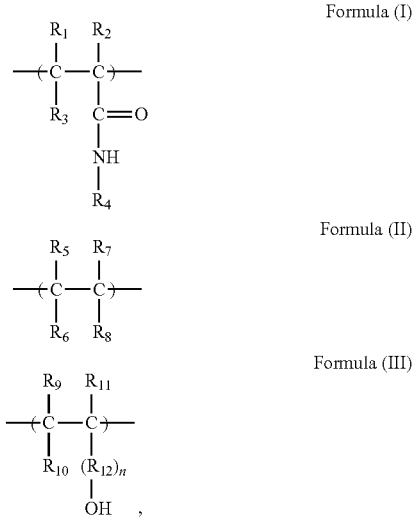

in which $R_1$, $R_2$, $R_3$, $R_5$, $R_6$, $R_7$, $R_9$, $R_{10}$, and $R_{11}$ are each independently selected from hydrogen or C1-C8 alkyl groups;

$R_4$ is selected from hydrogen, substituted or unsubstituted C1-C8 alkyl groups;

$R_8$ is selected from —COOM and sodium sulfonate phenyl, in which M is selected from H, and positive monovalent (+1) alkali metal ion;

$R_{12}$ is selected from unsubstituted or substituted C1-C8 alkyl groups, and n is 0 or 1.

In some embodiments, the negative electrode plate comprises the copolymer of the present application.

In some preferred embodiments, the negative electrode film comprises the copolymer of the present application.

In some embodiments, the mass proportion of the copolymer in the negative electrode film is $\geq 0.2\%$, preferably 0.6%-4.0%.

In some preferred embodiments, the step of preparing a negative electrode plate with the copolymer of the present application may include: dispersing the negative active material, the binder comprising the copolymer of the present application, and an optionally other binder and conductive agent in a solvent in which the solvent can be deionized water, to form a uniform negative electrode slurry; the negative electrode slurry is applied on the negative electrode current collector, and after being dried, cold pressed, and other steps, the negative electrode plate is obtained.

In some embodiments, the method for preparing the secondary battery further comprises the step of assembling the negative electrode plate, the positive electrode plate, and the electrolyte to form a secondary battery. In some embodiments, the positive electrode plate, the separator, and the negative electrode plate can be wound or laminated in order, so that the separator is located between the positive electrode plate and the negative electrode plate to serve as isolation, to form a battery core; the battery core is placed in an outer packaging, and then an electrolyte is injected and sealed to obtain a secondary battery according to the first aspect of the present application.

In some embodiments, the number of battery cores in the secondary battery can be one or more, which can be adjusted according to requirements.

In some embodiments, the outer packaging of the secondary battery may be a soft bag, such as a bag-type soft bag. The material of the soft bag can be plastic, such as one or more of polypropylene (PP), polybutylene terephthalate (PBT), polybutylene succinate (PBS). The outer packaging of the battery may also be a hard case, such as an aluminum case.

The present application does not particularly limit the shape of the secondary battery, which can be cylindrical, square or other arbitrary shapes. FIG. 1 shows a secondary battery 5 with a square structure as an example.

In some embodiments, the secondary battery can be assembled into a battery module, and the number of secondary batteries contained in the battery module can be multiple, and the specific number can be adjusted according to the application and capacity of the battery module.

Figure 2:
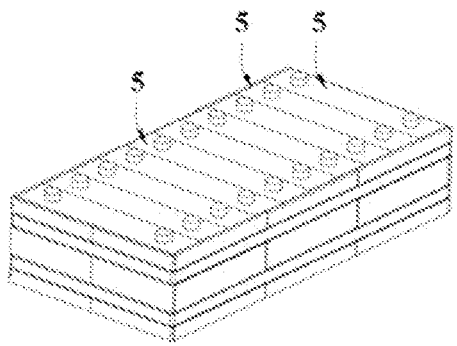
FIG. 2 is a schematic diagram of a battery module provided by an embodiment of the present application.

FIG. 2 shows a battery module 4 as an example. Referring to FIG. 2, in the battery module 4, a plurality of secondary batteries 5 may be disposed sequentially in the length direction of the battery module 4. Of course, the secondary batteries 5 may also be disposed in any other manner. Furthermore, the plurality of secondary batteries 5 may be fixed by fasteners.

Optionally, the battery module 4 may further comprise a housing with a receiving space, and the plurality of secondary batteries 5 are received in the receiving space.

In some embodiments, the above-mentioned battery module may also be assembled into a battery pack, and the number of battery modules contained in the battery pack can be adjusted according to the application and capacity of the battery pack.

Figure 3:
FIG. 3 is a schematic diagram of a battery pack provided by an embodiment of the present application.
Figure 4:
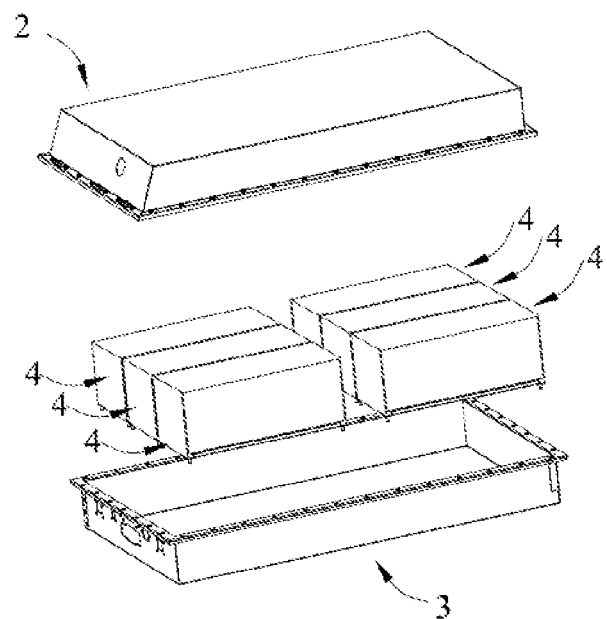
FIG. 4 is an exploded view of the battery pack in FIG. 3.

FIGS. 3 and 4 show a battery pack 1 as an example. Referring to FIGS. 3 and 4, the battery pack 1 may comprise a battery case and a plurality of battery modules 4 disposed in the battery case. The battery case comprises an upper case body 2 and a lower case body 3. The upper case body 2 can cover the lower case body 3 to form a closed space for receiving the battery modules 4. A plurality of battery modules 4 can be disposed in the battery case in any manner.

Copolymer

The second aspect of the present application provides a copolymer, wherein the copolymer comprises at least a first monomer unit represented by formula (I), a second monomer unit represented by formula (II), and a third monomer unit represented by formula (III):

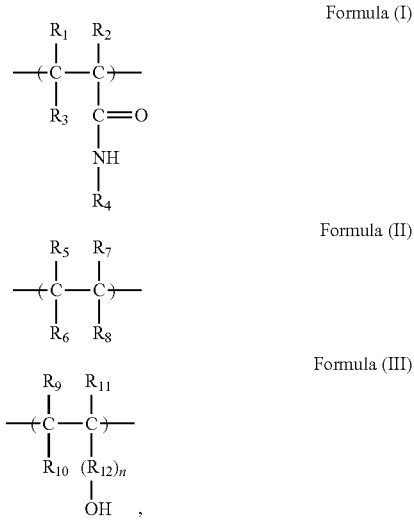

in which $R_1$, $R_2$, $R_3$, $R_5$, $R_6$, $R_7$, $R_9$, $R_{10}$, and $R_{11}$ are each independently selected from hydrogen or C1-C8 alkyl groups;

$R_4$ is selected from hydrogen, substituted or unsubstituted C1-C8 alkyl groups;

$R_8$ is selected from at least one of —COOM and sodium sulfonate phenyl, in which M is selected from H, and positive monovalent (+1) alkali metal ion;

$R_{12}$ is selected from unsubstituted or substituted C1-C8 alkyl groups, and n is 0 or 1.

Among them, $R_1$-$R_{12}$ and the preferred embodiments thereof have been described in detail above, and will not be repeated here.

The copolymer of the present application may be a random copolymer. The term "random" means in the present application that the comonomers of a random copolymer are randomly distributed within the copolymer. The term "random" is understood according to Glossary of Basic Terms in Polymer Science recommended by IUPAC, 1996.

The copolymers can be prepared by conventional polymerization methods in the art. According to a specific embodiment, the monomer mixture comprising the first monomer, the second monomer and the third monomer is reacted in the presence of an initiator. The type of the initiator is not particularly limited, and can be conventionally selected in the art. The initiator can be at least one of azobisisobutyronitrile, azobisisobutylamidine hydrochloride, azobisisobutylimidazoline hydrochloride, azobiscyanovaleric acid, azobisisopropylimidazole morphine. The polymerization conditions and the amount of the initiator are not particularly limited, and can be selected according to the specific types of monomers and initiators. According to a specific embodiment, the monomer mixture comprises A1, B1 and C2, the initiator is azodiisobutylamidine hydrochloride, and the amount of the initiator is 0.05-0.15 parts by weight relative to 100 parts by weight of the monomer mixture. The polymerization temperature is from 25° C. to 45° C., the polymerization is carried out under normal pressure (atmospheric pressure), and the polymerization time is from 2 to 8 hours.

In this application, the ratio of the first monomer unit, the second monomer unit and the third monomer unit may be converted according to the ratio of the first monomer, the second monomer and the third monomer. That is to say, the ratio of the first monomer unit, the second monomer unit and the third monomer unit can be considered to be approximately equal to the feeding ratio of the first monomer, the second monomer and the third monomer.

Apparatus

The third aspect of the present application provides an apparatus, comprising the secondary battery according to the first aspect of the present application, in which the secondary battery provides power for the apparatus. The apparatus may be, but is not limited to, a mobile apparatus (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The apparatus may comprise the secondary battery, the battery module or the battery pack selected according to its usage requirements.

Figure 5:
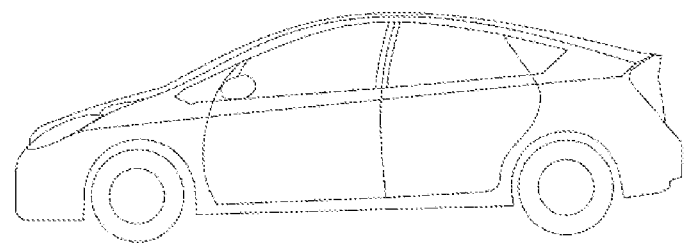
FIG. 5 is a schematic diagram of an apparatus provided by an embodiment of the present application.

FIG. 5 shows an apparatus as an example. The apparatus is a pure electric vehicle, a hybrid electric vehicle, or a plug-in hybrid electric vehicle. In order to meet the requirements of the apparatus for high power and high energy density of secondary batteries, the battery pack or battery module can be used.

As another example, the apparatus may be a mobile phone, a tablet computer, a notebook computer, etc. The apparatus is generally required to be thin and light, and the secondary battery can be used as a power supply.

Exemplary Embodiments

Embodiment 1. A secondary battery comprising a binder for binding a first substance and a second substance, the binder comprising a copolymer, wherein the copolymer comprises at least a first monomer unit represented by formula (I), a second monomer unit represented by formula (II), and a third monomer unit represented by formula (III):

Formula (I)
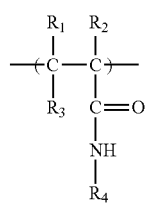

Formula (II)
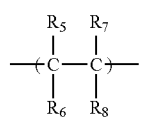

Formula (III)
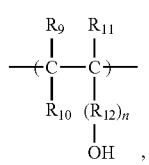

in which $R_1$, $R_2$, $R_3$, $R_5$, $R_6$, $R_7$, $R_9$, $R_{10}$, and $R_{11}$ are each independently selected from hydrogen or C1-C8 alkyl groups;

$R_4$ is selected from hydrogen, substituted or unsubstituted C1-C8 alkyl groups;

$R_8$ is selected from —COOM and sodium sulfonate phenyl, in which M is selected from H, and positive monovalent (+1) alkali metal ion;

$R_{12}$ is selected from unsubstituted or substituted C1-C8 alkyl groups, and n is 0 or 1.

Embodiment 2. The secondary battery of embodiment 1, wherein based on the total moles of the first monomer unit, the second monomer unit, and the third monomer unit, the first monomer unit is present in an amount of at least 40 mol %, preferably from 45 mol % to 85 mol %, more preferably from 60 mol % to 80 mol %.

Embodiment 3. The secondary battery of embodiment 1 or 2, wherein based on the total moles of the first monomer unit, the second monomer unit and the third monomer unit, the second monomer unit is present in an amount of at most 29.5 mol %, preferably from 6 mol % to 28 mol %, more preferably from 8 mol % to 18 mol %.

Embodiment 4. The secondary battery of any one of embodiments 1 to 3, wherein based on the total moles of the first monomer unit, the second monomer unit and the third monomer unit, the third monomer unit is present in an amount of at most 30.5 mol %, preferably from 7.5 mol % to 30 mol %, more preferably from 12 mol % to 24 mol %.

Embodiment 5. The secondary battery of any one of embodiments 1 to 4, wherein the molar ratio of the content of the first monomer unit to the content of the third monomer unit is 1:0.15-0.5, preferably 1:0.2-0.35.

Embodiment 6. The secondary battery of any one of embodiments 1 to 5, wherein the molar ratio of the content of the second monomer unit to the content of the third monomer unit is 1:1.05-2, preferably 1:1.1-1.6.

Embodiment 7. The secondary battery of any one of embodiments 1 to 6, wherein $R_1$, $R_2$, $R_3$, $R_5$, $R_6$, $R_7$, $R_9$, $R_{10}$, and $R_{11}$ are each independently selected from hydrogen or C1-C4 alkyl groups; and/or $R_4$ is selected from hydrogen, unsubstituted or substituted C1-C4 alkyl groups, in which M is selected from at least one of Li, Na and K; and/or, $R_{12}$ is selected from unsubstituted or substituted C1-C4 alkyl groups.

Embodiment 8. The secondary battery of any one of embodiments 1 to 7, wherein the first monomer unit comprises at least one of monomer units derived from A1 to A3 monomers; preferably, the first monomer unit comprises monomer units derived from A1 monomer:

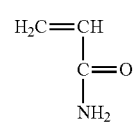

(A1)

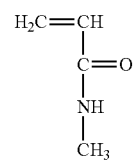

(A2)

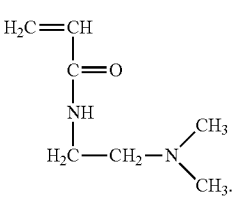

(A3)

Embodiment 9. The secondary battery of any one of embodiments 1 to 8, wherein the second monomer unit comprises at least one of monomer units derived from B1 to B3 monomers; preferably, the second monomer unit comprises monomer units derived from B1 monomer:

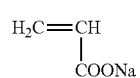

(B1)

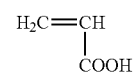

(B2)

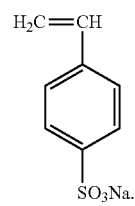

(B3)

Embodiment 10. The secondary battery of any one of embodiments 1 to 9, wherein the third monomer unit comprises at least one of monomer units derived from C1 to C3 monomers; preferably, the third monomer unit comprises monomer units derived from C2 monomer:

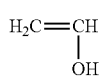

(C1)

$$\underset{(C2)}{\overset{H_2C=CH}{\underset{\overset{|}{CH_2}}{\underset{|}{OH}}}}$$

$$\underset{(C3)}{\overset{H_3C-CH=CH}{\underset{\overset{|}{CH_2.}}{\underset{|}{OH}}}}$$

Embodiment 11. The secondary battery of any one of embodiments 1 to 10, wherein the copolymer further satisfies one or more of the following conditions (1)-(3):
(1) an aqueous solution containing 10% by weight of the copolymer has a pH of above 7, preferably from 8 to 9;
(2) the copolymer has a glass transition temperature Tg of 30° C. to 80° C., preferably 40° C. to 70° C.;
(3) the copolymer has a molecular weight of 100,000 to 1,000,000, preferably 200,000 to 800,000.

Embodiment 12. The secondary battery of any one of embodiments 1 to 11, wherein the secondary battery comprises a positive electrode plate, a negative electrode plate and a separator, and one or more of the positive electrode plate, the negative electrode plate and the separator comprises the copolymer; preferably, the negative electrode plate comprises the copolymer.

Embodiment 13. The secondary battery of embodiment 12, wherein the negative electrode plate comprises a negative electrode current collector and a negative electrode film disposed on at least one surface of the negative electrode current collector, the negative electrode film comprising the copolymer.

Embodiment 14. The secondary battery of embodiment 13, wherein the mass proportion of the copolymer in the negative electrode film is ≥ 0.2%, preferably 0.6%-4.0%.

Embodiment 15. A method for preparing a secondary battery, including using a copolymer in one or more of a positive electrode plate, a negative electrode plate and a separator, wherein the copolymer comprises at least a first monomer unit represented by formula (I), a second monomer unit represented by formula (II), and a third monomer unit represented by formula (III):

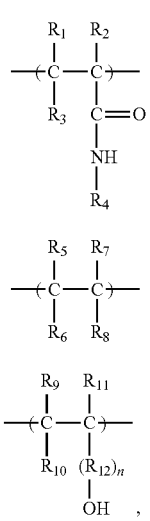

Formula (I)

Formula (II)

Formula (III)

in which $R_1$, $R_2$, $R_3$, $R_5$, $R_6$, $R_7$, $R_9$, $R_{10}$, and $R_{11}$ are each independently selected from hydrogen or C1-C8 alkyl groups;
$R_4$ is selected from hydrogen, substituted or unsubstituted C1-C8 alkyl groups;
$R_8$ is selected from —COOM and sodium sulfonate phenyl, in which M is selected from H, and positive monovalent (+1) alkali metal ion;
$R_{12}$ is selected from unsubstituted or substituted C1-C8 alkyl groups, and n is 0 or 1.

Embodiment 16. A copolymer, wherein the copolymer comprises at least a first monomer unit represented by formula (I), a second monomer unit represented by formula (II), and a third monomer unit represented by formula (III):

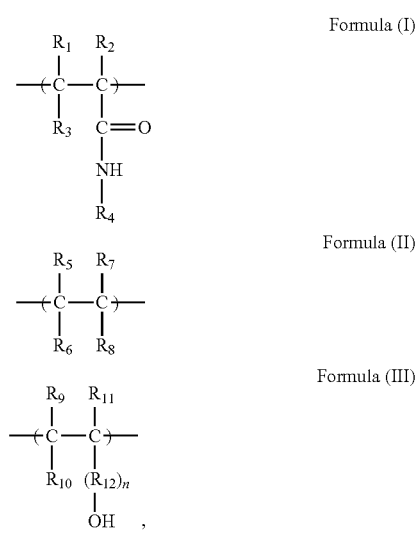

Formula (I)

Formula (II)

Formula (III)

in which $R_1$, $R_2$, $R_3$, $R_5$, $R_6$, $R_7$, $R_9$, $R_{10}$, and $R_{11}$ are each independently selected from hydrogen or C1-C8 alkyl groups;
$R_4$ is selected from hydrogen, substituted or unsubstituted C1-C8 alkyl groups;
$R_8$ is selected from —COOM and sodium sulfonate phenyl, in which M is selected from H, and positive monovalent (+1) alkali metal ion;
$R_{12}$ is selected from unsubstituted or substituted C1-C8 alkyl groups, and n is 0 or 1.

Embodiment 17. An apparatus comprising the secondary battery of any one of embodiments 1 to 14.

EXAMPLES

The following examples describe the disclosure of the present application in more detail and are provided for illustrative purposes only, as various modifications and changes within the scope of the disclosure of the present application will be apparent to those skilled in the art. Unless otherwise stated, all parts, percentages, and ratios described in the following embodiments are based on weight, all reagents used in the embodiments are commercially available or synthesized according to conventional methods and can be directly used without further treatment, and all instruments used in the embodiments are commercially available.

Selected first monomers: A1, A2 and A3;
selected second monomers: B1, B2 and B3;
selected third monomers: C1, C2 and C3.

Example 1

1. Preparation of Secondary Battery (1) Preparation of Copolymer:

The first monomer A1, the second monomer B1 and the third monomer C1 were fed in a molar ratio of 75:10:15, and were polymerized in the presence of initiator azodiisobutylamidine hydrochloride, in which the initiator was used in an amount of 0.1 parts by weight relative to 100 parts by weight of A1, B1 and C1. The polymerization temperature was 25° C-35° C., the polymerization pressure was 101 KPa, and the polymerization time was 4 hours. The molar ratio of A1, B1, and C1 in the prepared copolymer was 75:10:15.

(2) Preparation of Negative Electrode Plate

The negative active material artificial graphite, the conductive agent acetylene black, the copolymer prepared in the above step (1), the dispersant CMC-Na, and the binder SBR were fully stirred and mixed at a mass ratio of 96:1:1:1.5:0.5 in an appropriate amount of deionized water to form a uniform negative electrode slurry. The negative electrode slurry was applied on the negative electrode current collector copper foil. After dried and cold pressed, a negative electrode plate was obtained.

(3) Preparation of Positive Electrode Plate

The positive active material $LiNi_{0.5}Co_{0.2}Mn_{0.3}O_2$, the conductive agent acetylene black, and the binder polyvinylidene fluoride (PVDF) were fully stirred and mixed at a weight ratio of 96:2:2 in an appropriate amount of NMP to make the a uniform positive electrode slurry; the positive electrode slurry was applied on the positive electrode current collector aluminum foil. After dried and cold pressed, the positive electrode plate was obtained.

(4) Separator

A PE porous film was used as a separator.

(5) Preparation of Electrolyte

In an argon-filled glove box, ethylene carbonate (EC), ethyl methyl carbonate (EMC), and diethyl carbonate (DEC) were mixed at a volume ratio of 1:1:1, and then $LiPF_6$ was uniformly dissolved in the above solution to obtain an electrolyte. The concentration of $LiPF_6$ was 1 mol/L.

(6) Preparation of Secondary Battery

The positive electrode plate, the separator, and the negative electrode plate were stacked in order, so that the separator is located between the positive electrode plate and the negative electrode plate to serve as isolation. After winding, a bare battery core was obtained, and then the tabs were welded. The bare battery core was put into the outer packaging, and the above-mentioned electrolyte was added, and after encapsulation, standing, formation, and aging, a secondary battery was obtained.

Examples 2-29 and Comparative Examples 1-2

The preparation was performed according to the method of Example 1, and the difference was detailed in Table 1.

TABLE 1

| No. | Copolymer | | | | Weight parts of copolymer | Weight parts of CMC-Na | Weight parts of SBR |
| --- | --- | --- | --- | --- | --- | --- | --- |
| | First monomer | Second monomer | Third monomer | Molar ratio | | | |
| Example 1 | A1 | B1 | C1 | 75:10:15 | 1 | 1.5 | 0.5 |
| Example 2 | A1 | B1 | C2 | 75:10:15 | 1 | 1.5 | 0.5 |
| Example 3 | A1 | B1 | C3 | 75:10:15 | 1 | 1.5 | 0.5 |
| Example 4 | A1 | B2 | C2 | 75:10:15 | 1 | 1.5 | 0.5 |
| Example 5 | A1 | B3 | C2 | 75:10:15 | 1 | 1.5 | 0.5 |
| Example 6 | A2 | B1 | C2 | 75:10:15 | 1 | 1.5 | 0.5 |
| Example 7 | A3 | B1 | C2 | 75:10:15 | 1 | 1.5 | 0.5 |
| Example 8 | A1 | B1 | C2 | 35:30:35 | 1 | 1.5 | 0.5 |
| Example 9 | A1 | B1 | C2 | 45:25:30 | 1 | 1.5 | 0.5 |
| Example 10 | A1 | B1 | C2 | 50:22:28 | 1 | 1.5 | 0.5 |
| Example 11 | A1 | B1 | C2 | 55:20:25 | 1 | 1.5 | 0.5 |
| Example 12 | A1 | B1 | C2 | 60:15:25 | 1 | 1.5 | 0.5 |
| Example 13 | A1 | B1 | C2 | 80:8:12 | 1 | 1.5 | 0.5 |
| Example 14 | A1 | B1 | C2 | 85:6:9 | 1 | 1.5 | 0.5 |
| Example 15 | A1 | B1 | C2 | 92:3:5 | 1 | 1.5 | 0.5 |
| Example 16 | A1 | B2 | C2 | 80:8:12 | 1 | 1.5 | 0.5 |
| Example 17 | A1 | B3 | C3 | 60:18:22 | 1 | 1.5 | 0.5 |
| Example 18 | A2 | B1 | C2 | 70:12:18 | 1 | 1.5 | 0.5 |
| Example 19 | A2 | B2 | C3 | 65:15:20 | 1 | 1.5 | 0.5 |
| Example 20 | A2 | B3 | C1 | 45:25:30 | 1 | 1.5 | 0.5 |
| Example 21 | A3 | B1 | C3 | 85:7:8 | 1 | 1.5 | 0.5 |
| Example 22 | A3 | B2 | C1 | 70:18:12 | 1 | 1.5 | 0.5 |
| Example 23 | A3 | B3 | C2 | 35:30:35 | 1 | 1.5 | 0.5 |
| Example 24 | A1 | B1 | C2 | 75:10:15 | 0.5 | 1.5 | 1 |
| Example 25 | A1 | B1 | C2 | 75:10:15 | 1.5 | 1 | 0.5 |
| Example 26 | A1 | B1 | C2 | 75:10:15 | 3 | 0 | 0 |
| Example 27 | A1 | B1 | C2 | 75:10:15 | 1 | 1 | 1 |
| Example 28 | A1 | B1 | C2 | 75:10:15 | 1.5 | 1.5 | 0 |
| Example 29 | A1 | B1 | C2 | 75:10:15 | 1.5 | 0 | 1.5 |
| Comparative example 1 | / | / | / | / | 0 | 1.5 | 1.5 |
| Comparative example 2 | A1 | B1 | / | 70:30 | 1 | 1.5 | 0.5 |

Test Section (1) Bonding Force Between the Negative Electrode Film and the Negative Electrode Current Collector:

A coated and cold-pressed negative electrode plate was cut into a test sample with a length of 100 mm and a width of 10 mm. A stainless steel plate with a width of 25 mm was taken, with a double-sided tape (width 11 mm) pasted thereon; the test sample was adhered on the double-sided tape on the stainless steel plate, and it was rolled back and forth three times (300 mm/min) with a 2000 g roller on its surface. The test sample was bent at 180 degrees, the negative electrode film of the test sample and the current collector were manually peeled off by 25 mm. Then the test sample was fixed on the testing machine, keeping the peeling surface consistent with the testing machine force line. The test machine continuously peeled at 300 mm/min, and the obtained peel force curve was taken as the average value of the smooth break as the peel force F0, then the bonding force F between the negative electrode film and the current collector in the test sample was F=F0/the width of the test sample (Measurement unit of F: N/m).

(2) Cycle Life Performance of Secondary Battery

At 25° C., the first charge and discharge were performed, and constant current and constant voltage charging was performed at a charging current of 0.5C (i.e., the current value that fully discharged the theoretical capacity within 2 h) until the upper limit of voltage was 4.25V. Then, constant current discharge was performed at a discharge current of 0.5C until the final voltage was 2.8V, and the discharge capacity value of the first cycle was recorded. Subsequently, 500 charge-discharge cycles were performed, the discharge capacity value during the cycle was recorded, and the cycle capacity retention rate was calculated.

Capacity retention rate after the $500^{th}$ cycle=(discharge capacity of the $500^{th}$ cycle/discharge capacity of the $1^{st}$ cycle)×100%

(3) Cycle Expansion Force of Secondary Battery

The battery was assembled into a steel clamp, making the bottom and four sides of the battery close to the steel clamp. The steel plate was adjusted to preload to 2000N, a pressure sensor was placed between the steel clamp and the battery, connected to the computer, and the expansion force of the battery after 500 cycles was measured.

The results of Examples 1-29 and Comparative Examples 1-2 were shown in Table 2:

TABLE 2

| No. | Boding force (N/m) | Cycle 500 cycles | Expansion force 500 cycles |
|---|---|---|---|
| Example 1 | 16.4 | 85.3% | 14875 |
| Example 2 | 17.8 | 87.7% | 13593 |
| Example 3 | 16.8 | 86.2% | 14649 |
| Example 4 | 17.4 | 87.1% | 13787 |
| Example 5 | 16.9 | 86.6% | 13807 |
| Example 6 | 16.6 | 85.8% | 14795 |
| Example 7 | 16.3 | 85.1% | 15085 |
| Example 8 | 13.4 | 81.6% | 16490 |
| Example 9 | 15.5 | 82.8% | 15911 |
| Example 10 | 16.2 | 83.5% | 15494 |
| Example 11 | 16.6 | 84.6% | 14905 |
| Example 12 | 16.8 | 85.0% | 14859 |
| Example 13 | 17.5 | 86.4% | 14107 |
| Example 14 | 16.0 | 83.4% | 15808 |
| Example 15 | 14.9 | 81.7% | 16385 |
| Example 16 | 16.4 | 86.5% | 14926 |
| Example 17 | 16.0 | 83.2% | 15693 |
| Example 18 | 15.7 | 82.7% | 14747 |
| Example 19 | 15.3 | 82.4% | 15723 |
| Example 20 | 14.3 | 81.8% | 15932 |
| Example 21 | 14.5 | 82.0% | 15915 |
| Example 22 | 13.8 | 81.5% | 16264 |
| Example 23 | 13.1 | 81.1% | 16529 |
| Example 24 | 14.3 | 82.9% | 15047 |
| Example 25 | 18.0 | 87.9% | 13498 |
| Example 26 | 18.2 | 88.5% | 13243 |
| Example 27 | 17.3 | 84.8% | 14925 |
| Example 28 | 17.6 | 85.4% | 13515 |

TABLE 2-continued

| No. | Boding force (N/m) | Cycle 500 cycles | Expansion force 500 cycles |
|---|---|---|---|
| Example 29 | 17.4 | 85.7% | 13531 |
| Comparative example 1 | 11.8 | 77.8% | 19110 |
| Comparative example 2 | 12.2 | 80.4% | 16835 |

It can be seen from the bonding force results in Table 2 that the copolymers provided in the present application had an obvious effect of improving the bonding force of the negative electrode plate, and can partially or completely replace CMC-Na and SBR.

It can be seen from the cycle life results in Table 2 that the use of the copolymer provided by the present application can effectively improve the cycle life of the battery.

It can be seen from the cycle expansion force results in Table 2 that the use of the copolymer provided by the present application can effectively reduce the expansion force of the battery during cycle.

Further, it can be seen from the results in Table 2 that when the types and/or contents of the first monomer unit, the second monomer unit and/or the third monomer unit were within the preferred range of the present application, the cycle life and expansion force of the battery achieved better results.

The above mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

What is claimed is:

1. A copolymer, wherein the copolymer comprises at least a first monomer unit represented by formula (I), a second monomer unit represented by formula (II), and a third monomer unit represented by formula (III):

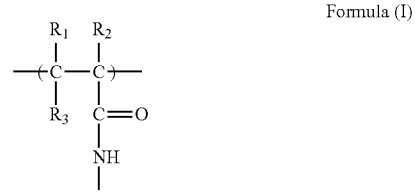

Formula (I)

Formula (II)

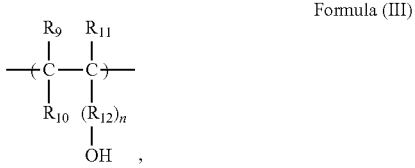

Formula (III)

in which $R_1$, $R_2$, $R_3$, $R_5$, $R_6$, $R_7$, $R_9$, $R_{10}$, and $R_{11}$ are each independently selected from hydrogen or C1-C8 alkyl groups;

$R_4$ is selected from hydrogen, substituted or unsubstituted C1-C8 alkyl groups;

$R_8$ is selected from —COOM and sodium sulfonate phenyl, in which M is selected from H, and positive monovalent (+1) alkali metal ion;

$R_{12}$ is selected from unsubstituted or substituted C1-C8 alkyl groups, and n is 0 or 1;

wherein the first monomer unit comprises monomer units derived from A1 monomer:

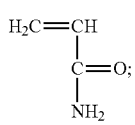

(A1)

wherein the second monomer unit comprises monomer units derived from B1 monomer:

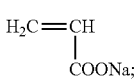

(B1)

wherein the third monomer unit comprises monomer units derived from C2 monomer:

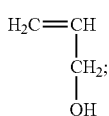

(C2)

wherein based on the total moles of the first monomer unit, the second monomer unit, and the third monomer unit, the first monomer unit is present in an amount of 60 mol % to 80 mol %;

wherein based on the total moles of the first monomer unit, the second monomer unit and the third monomer unit, the second monomer unit is present in an amount of 8 mol % to 18 mol %;

wherein based on the total moles of the first monomer unit, the second monomer unit and the third monomer unit, the third monomer unit is present in an amount of 12 mol % to 24 mol %.

2. A secondary battery comprising a binder for binding a first substance and a second substance, wherein the binder comprises the copolymer according to claim 1.

3. The secondary battery of claim 2, wherein a molar ratio of a content of the first monomer unit to a content of the third monomer unit is 1:0.15-0.5, and/or a molar ratio of a content of the second monomer unit to a content of the third monomer unit is 1:1.05-2.

4. The secondary battery of claim 2, wherein
$R_1$, $R_2$, $R_3$, $R_5$, $R_6$, $R_7$, $R_9$, $R_{10}$, and $R_{11}$ are each independently selected from hydrogen or C1-C4 alkyl groups; and/or $R_4$ is selected from hydrogen, unsubstituted or substituted C1-C4 alkyl groups, in which M is selected from at least one of Li, Na and K; and/or, $R_{12}$ is selected from unsubstituted or substituted C1-C4 alkyl groups.

5. The secondary battery of claim 2, wherein the secondary battery comprises a positive electrode plate, a negative electrode plate and a separator, and one or more of the positive electrode plate, the negative electrode plate and the separator comprises the copolymer.

6. The secondary battery of claim 5, wherein the negative electrode plate comprises a negative electrode current collector and a negative electrode film disposed on at least one surface of the negative electrode current collector, the negative electrode film comprising the copolymer.

7. An apparatus comprising the secondary battery of claim 2.

8. The secondary battery of claim 2, wherein a molar ratio of a content of the first monomer unit to a content of the third monomer unit is 1:0.2-0.35, and/or a molar ratio of the content of a second monomer unit to a content of the third monomer unit is 1:1.1-1.6.

9. The secondary battery of claim 5, wherein the negative electrode plate comprises the copolymer.

10. The secondary battery of claim 6, wherein a mass proportion of the copolymer in the negative electrode film is ≥0.2%.

11. The secondary battery of claim 6, wherein a mass proportion of the copolymer in the negative electrode film is 0.6%-4.0%.

12. A method for preparing a secondary battery, including using a copolymer in one or more of a positive electrode plate, a negative electrode plate and a separator, wherein the copolymer comprises at least a first monomer unit represented by formula (I), a second monomer unit represented by formula (II), and a third monomer unit represented by formula (III):

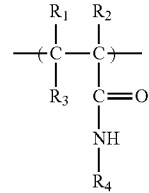

Formula (I)

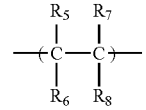

Formula (II)

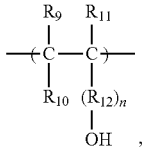

Formula (III)

in which $R_1$, $R_2$, $R_3$, $R_5$, $R_6$, $R_7$, $R_9$, $R_{10}$, and $R_{11}$ are each independently selected from hydrogen or C1-C8 alkyl groups;

$R_4$ is selected from hydrogen, substituted or unsubstituted C1-C8 alkyl groups;

$R_8$ is selected from —COOM and sodium sulfonate phenyl, in which M is selected from H, and positive monovalent (+1) alkali metal ion;

$R_{12}$ is selected from unsubstituted or substituted C1-C8 alkyl groups, and n is 0 or 1;

wherein the first monomer unit comprises monomer units derived from A1 monomer:

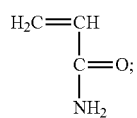
(A1)

wherein the second monomer unit comprises monomer units derived from B1 monomer:

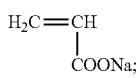
(B1)

wherein the third monomer unit comprises monomer units derived from C2 monomer:

(C2)

wherein based on the total moles of the first monomer unit, the second monomer unit, and the third monomer unit, the first monomer unit is present in an amount of 60 mol % to 80 mol %;

wherein based on the total moles of the first monomer unit, the second monomer unit and the third monomer unit, the second monomer unit is present in an amount of 8 mol % to 18 mol %;

wherein based on the total moles of the first monomer unit, the second monomer unit and the third monomer unit, the third monomer unit is present in an amount of 12 mol % to 24 mol %.

\* \* \* \* \*